United States Patent [19]

Baker et al.

[11] 3,740,127
[45] June 19, 1973

[54] PROJECTOR APPARATUS

[75] Inventors: Philip G. Baker, Peabody; Stewart Bennett, Concord; Richard W. Young, Wellesley Hills, all of Mass.

[73] Assignee: Polaroid Corporation, Cambridge, Mass.

[22] Filed: Aug. 24, 1971

[21] Appl. No.: 174,373

[52] U.S. Cl............. 352/72, 352/123, 350/128
[51] Int. Cl............................................. G03b 23/02
[58] Field of Search ...................... 352/72, 78, 123; 350/127, 128, 129; 353/77, 38, 70

[56] References Cited
UNITED STATES PATENTS

| | | | |
|---|---|---|---|
| 2,326,042 | 8/1943 | Lessman | 350/128 |
| 2,464,220 | 3/1949 | Duncan et al. | 353/77 X |
| 2,531,399 | 11/1950 | Cawein et al. | 350/127 X |
| 2,567,656 | 9/1951 | Siezen | 350/128 |
| 2,596,049 | 5/1952 | Siezen | 350/127 |
| 3,191,495 | 6/1965 | Miller | 350/128 |
| 3,195,401 | 7/1965 | Lange | 353/77 |
| 3,279,314 | 10/1966 | Miller | 353/70 X |
| 3,383,998 | 5/1968 | Takats | 95/90.5 |
| 3,592,537 | 7/1971 | Kakiuchi | 352/72 |
| 3,608,455 | 9/1971 | Downey | 95/13 |

FOREIGN PATENTS OR APPLICATIONS

| | | | |
|---|---|---|---|
| 766,051 | 1/1957 | Great Britain | 350/129 |
| 607,337 | 8/1960 | Italy | 353/77 |

*Primary Examiner*—Samuel S. Matthews
*Assistant Examiner*—Alan Mathews
*Attorney*—Charles Mikulka, Robert F. Peck, Stanley H. Meruis et al.

[57] ABSTRACT

A rear projection viewer, for projection of images of a film strip housed in a motion picture cassette, employing a single reflective mirror and an inclined viewing screen in a compact arrangement wherein the screen provides substantially the complete front face of the viewer. In its preferred embodiment, the viewer is configured for operation of a multipurpose cassette for processing of the film strip of such cassette and subsequent projection of the images recorded on such film strip, and the cassette includes a processing station adapted for optimumly dispensing processing fluid across the film strip when the cassette is maintained in an attitude such that the incremental sections of the film progressively advanced across the projection station opening are located in a predetermined plane. A cassette-receiving well, disposed in the top of the viewer housing, is adapted to receive the cassette and locate it below the top of the screen in an operative position with the progressively advanced, incremental sections of film disposed in the predetermined plane. Preferably, the screen is a lenticular structure which transmits projected images substantially uniformly over a given viewing zone, and additionally directs the viewing zone downwardly from an axis normal to the screen in at least partial compensation for the angle of inclination of the screen such that the viewing zone will include an audience area located along the longitudinal axis of the apparatus.

5 Claims, 4 Drawing Figures

PATENTED JUN 19 1973

INVENTORS
PHILIP G. BAKER
STEWART BENNETT
RICHARD W. YOUNG

BY Brown and Mikulka
and
David R. Thornton
ATTORNEYS

PATENTED JUN 19 1973

INVENTORS
PHILIP G. BAKER
STEWART BENNETT
RICHARD W. YOUNG

BY Brown and Mikulka
and
David R. Thornton
ATTORNEYS

PROJECTOR APPARATUS

BACKGROUND OF THE INVENTION

1. Field of the Invention

This invention relates to photographic apparatus and more particularly to a motion picture rear projection apparatus for use with photographic film cassette.

2. Description of the Prior Art

Rear projection viewer apparatus in which the projection system and the viewing screen are combined in a single structural unit are available in the prior art. Among other advantages, this type of projector apparatus can provide a fully portable unit which permits satisfactory pictorial displays in high ambient light conditions, and is particularly suited to those instances where available space is limited. For compactness, such apparatus generally employ a multiple folded projection path with an attendant light loss which reduces its optical efficiency.

In equipment of the type with which the invention is concerned, the screen comprises one surface of the apparatus housing. Normally, portions of the projection system are located outside the area bounded by screen and imaginary planes extended rearwardly from its perimeter. Hence, the profile of the projector housing greatly exceeds the screen area.

Further, with the advent of motion picture film cassettes, which generally are flat planar units having an opening which facilitates projection, located at one of the narrow edges of its casing, an additional burden is placed upon he projector system since in addition to the necessary space for a proper projection path length from film to screen, the cassette requires a given extension of unit housing. This problem is alleviated to some degree in many commercial devices by positioning the cassette such that its planar surface lies in the horizontal plane and by utilizing a number of reflective elements for projecting an image to the viewer screen.

The latter arrangements, however, often result in bulky, ungainly structures having an unsatisfactory form-factor and additionally, are not suitable for processing and projection of multipurpose cassette, such as described in copending application Ser. No. 813,469 of Rogers B. Downey filed Apr. 4, 1969, now U.S. Pat. No. 3,608,455 which are designed for exposure, processing and projection without removal of the film from the cassette casing. Hence, a viewer designed for operation of such cassette should include means for operating the cassette during film processing and for subsequent projection of the film while the cassette is maintained in a fixed location. Inasmuch as the processing station employed in these cassettes should be maintained in a given attitude for optimum results, for example, in position to not only utilize gravitational flow of the fluid to the film but also to negate flow transverse to the film which could result in irregular fluid distribution, the position and orientation of the process-project station of the viewer is necessarily limited.

In the aforementioned copending application, the disclosed cassette comprises a flat parallelepiped casing having a projection station opening in one of its elongated edges. Mounted within the casing is a processing station, designed for optimum operation when it is oriented in an upright or vertical position above the indicated edge. That is, optimum operation of the processing station of such cassette is achieved when the cassette is oriented such that its edge which includes the projection station opening is horizontal. Consequently, it is preferable to locate such a cassette in the above-noted attitude for processing of its film strip.

Accordingly, it is an important object of this invention to provide a highly compact rear projection apparatus.

Another primary object of this invention is to provide a compact projection apparatus having a single light reflective element disposed between the film and the image screen.

A further object of this invention is to provide a rear projection apparatus whose viewing face is substantially determined by the overall dimensions of the viewing screen.

Still another object of this invention is to provide a compact rear projection apparatus which maintains a motion picture cassette in a suitable attitude for development and projection of the film carried by such cassette.

SUMMARY OF THE INVENTION

The apparatus of the invention, which in its illustrated embodiment is particularly adapted for use with motion film cassettes for processing and subsequent projection of images recorded on the film strip carried therein, comprises a housing having a front viewing face including a viewing screen, a cassette-receiving well disposed within the housing rearwardly of the screen and within an area bounded by imaginary planes extending in parallel relation from the edges thereof, and means within said housing for projection of images of such film strip to said viewing screen including a single reflective elements disposed between such film and said viewing screen.

In the preferred embodiment, the apparatus is adapted for use with a multipurpose photographic film cassette having an opening for facilitating projection of images recorded on its film strip, means for advancing the film strip across the opening, and selectively operable means for processing the film strip during such advancement when the opening is maintained in a lowermost position. The apparatus comprises a box-like housing having a front viewing face which includes a viewing screen. Mounted rearwardly of the screen and in communication with the top surface of the housing is a cassette-receiving well configured for receiving the film cassette and for locating its opening at the bottom of the well. Beneath the cassette-receiving well, in registration with the opening of the cassette, is a projector lens system which is adapted to project film images in a downwardly direction to a mirror element positioned at the base of the apparatus. The mirror, in turn, redirects the projection path upwardly at a small angle to the horizontal and forwardly towards the front viewing screen, and the latter is tilted rearwardly over its base so as to be located in a plane substantially normal to the redirected projection path.

Preferably, the viewing screen is lenticulated to transmit the projected image over a given viewing zone which is rotated downwardly from the redirected projection path in at least partial compensation for the upwardly inclined angle of the latter. Hence, the arrangement provides a highly compact, single mirror projection system having a most desirable form-factor and providing a controlled viewing zone designed to include an audience located forwardly of the apparatus housing along its longitudinal axis.

BRIEF DESCRIPTION OF THE DRAWINGS

The novel features that are considered characteristic of the invention are set forth with particularlity in the appended claims. The invention itself, however, both as to its organization and its method of operation, together with additional objects and advantages thereof, will be best understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
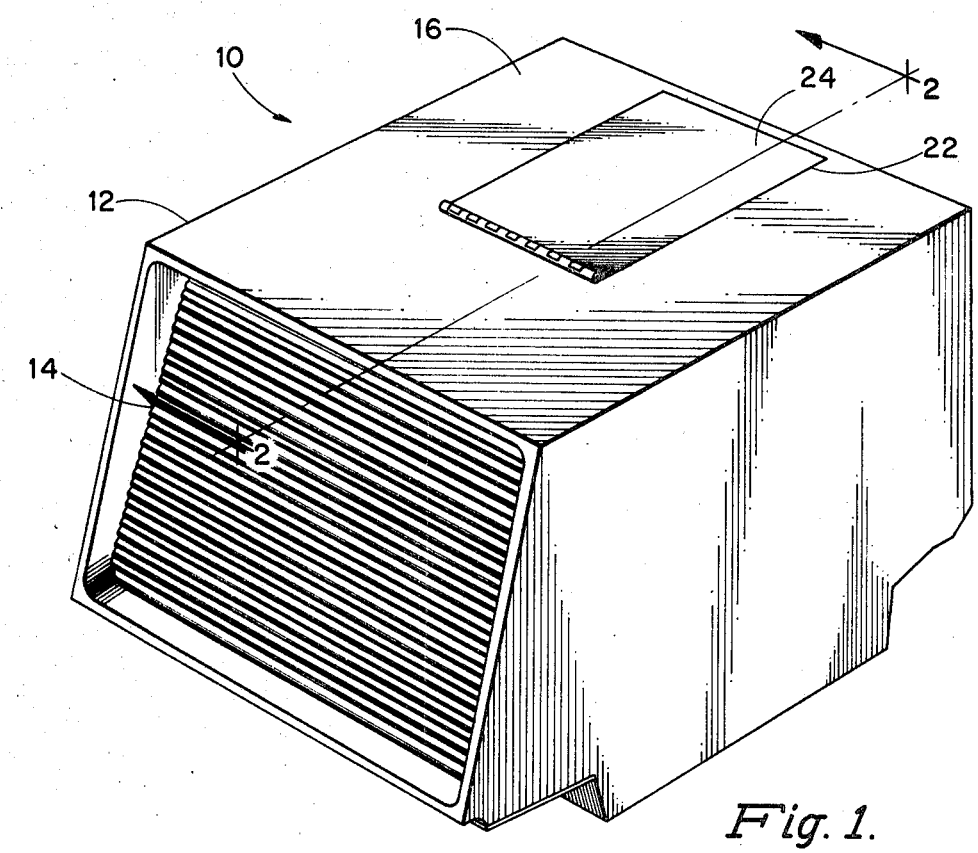
FIG. 1 is a diagrammatic view in perspective of a motion picture viewer embodying the features of this invention.
Figure 2:
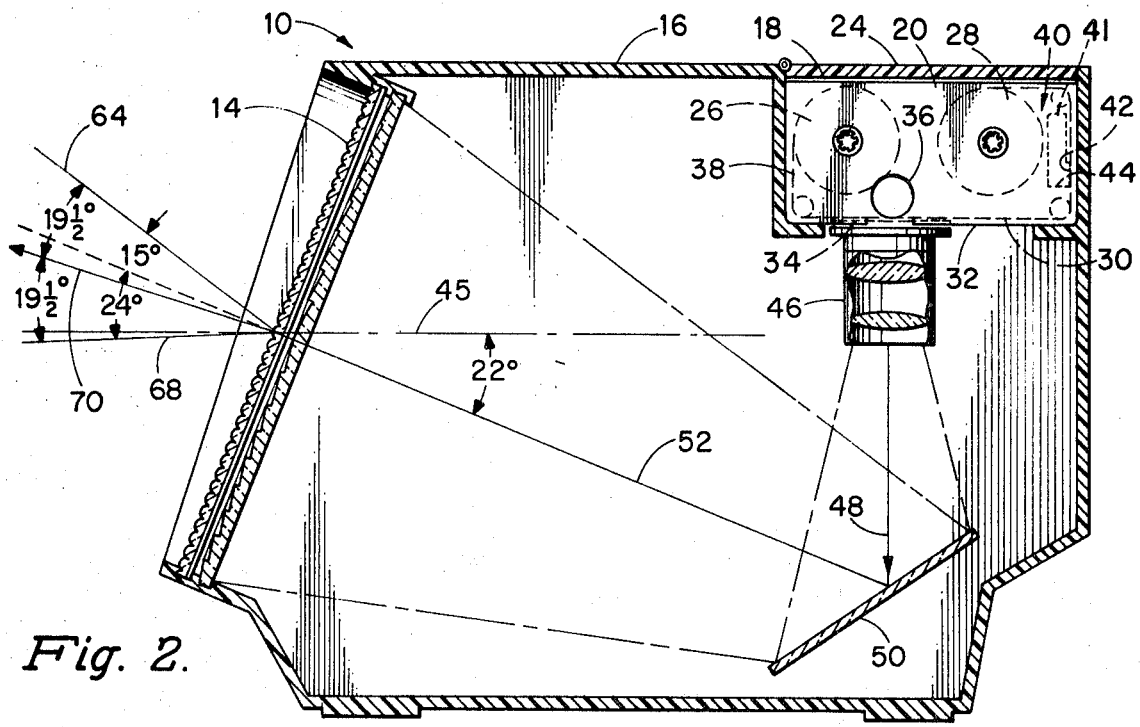
FIG. 2 is a diagrammatic sectional view taken along the line 2—2 of FIG. 1.

As shown in FIGS. 1 and 2, the photographic apparatus of the present invention preferably takes the form of a rear projection viewer 10 comprising a box-like housing 12 defined in part by a viewing screen 14. Positioned rearwardly of screen 14 and in adjoining relation to the top surface 16 of the housing 12 is a cassette-receiving well 18 which is adapted to hold a motion picture film cassette 20 as shown in FIG. 2. The cassette-receiving well 18 extends to and is in communication with an opening 22 in the top surface 16 of the housing 12. Pivotally mounted at the forward edge of opening 22 is a door member 24 for controlling access to cassette-well 18. Hence, the door 24 is mounted for pivotal motion between a closed position blocking the opening 22 and an open position permitting insertion and removal of the cassette 20.

The cassette 20 is a multipurpose motion picture film cassette such as described in the aforementioned copending application and comprises a generally flat, parallelepiped casing enclosing a pair of motion picture film spools 26 and 28 upon which a motion picture film 30 is disposed for transport between one spool and the other in an arrangement wherein portions of the film are advanced in a plane parallel to the lower edge 32 of the cassette. Within the lower edge 32, is an opening 34 which facilitates projection of the images recorded on the film 30. The opening 34 serves to facilitate both exposure and projection inasmuch as it permits image bearing light rays to impinge on progressive incremental sections of the film strip 30 retained within the cassette to facilitate exposure and subsequently permit light rays from an external source to be directed through the incremental sections outwardly of the cassette to facilitate projection operations. Thus the opening 34 first comprises an exposure station and subsequently a projection station of the cassette 20.

Figure 3:
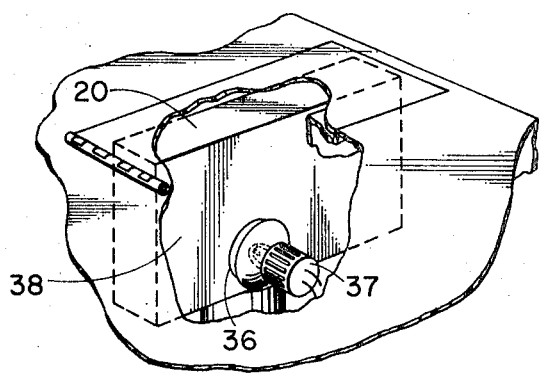
FIG. 3 is a fragmentary view in perspective illustrating the relationship of the cassette and the projection lamp arrangement of the viewer.

Means are also provided in the cassette 20 to permit entrance of suitable illumination and redirecting of such illumination in a downward direction through the film 30 and out of the opening 34. For example, an opening or aperture 36 is provided in one side wall 38 of the cassette 20, and a reflector element (not shown) such as a mirror or prism is included within the cassette to redirect light, entering aperture 36, through the incremental sections of the film and out of the cassette through opening 34. Hence, an illuminating means, for example, a conventional projection lamp such as a DNF Halogen Lamp 150 QTB/LVD marketed by the Photolamp Products Division, Sylvania Electric Products, Inc. of Salem Massachusetts, is mounted in the apparatus so as to suitably direct illumination into the cassette 20. This is illustrated in FIG. 3 wherein a projection lamp 37 is shown mounted in an adjoining relation to the illumination aperture 36 of the cassette.

Referring again to FIGS. 1 and 2, cassette 20 also includes a processing station 40, such as described in the aforementioned copending application. The station 40 includes a processor 41 which is designed for selective operation for distribution of an appropriate processing fluid (not shown) over the film during transport of the latter past the dispensing surface or processor mouth 42 near the bottom 44 of the processor 41. Consequently, inasmuch as the apparatus of the invention is intended for the dual function of processing and projection and since the processing station 40 of the cassette 20 is arranged for operation at a given angle with respect to the plane of the film gate or opening 34, the cassette well 18 is configured to locate the cassette in a proper attitude for both operations.

In the preferred embodiment, the processor 41 extends perpendicularly to the plane of the film gate opening 34, and is intended for operation in an upright attitude which facilitates gravitational flow of its enclosed fluid (not shown) to the lower dispensing mouth 42 and provides a longitudinal, or lengthwise distribution across the moving film. Consequently, inasmuch as the cassette 20 is constructed such that the processor 41 is normal to the edge 32, or that is, to the plane of the film as it advances across opening 34, the well 18 is adapted to locate the cassette in the vertical plane with the edge 32 parallel to the longitudinal axis 45 of the viewer 10, and hence, in the horizontal plane.

Included within housing 12 in adjoining relation to the cassette-receiving well 18 are means (not shown) for driving spools 26 and 28 and for advancing film 30 across opening 34. For example, appropriate drive shafts (not shown) are adapted to engage the spools 26 and 28 and suitably rotate them, and a conventional claw arrangement (not shown) is adapted to engage film 30 in a conventional manner in the vicinity of the cassette opening 34 so as to progressively advance incremental sections of the film thereacross.

Mounted beneath the cassette-receiving well 18, in alignment with the film gate opening 34 is lens assembly 46, adapted to project an image of the film presented at the opening 34 and focus it at a given distance from film 30. In this case, lens 46 projects the image vertically downward along an optical axis designated as 48. A reflective means, such as a mirror 50, is mounted in the path of the projection axis 48 and at an acute angle thereto so as to redirect the projected track along another axis 52 forwardly from axis 48 and inclined upwardly from the horizontal to the screen 14. The latter is preferably disposed substantially normal to axis 52 to reduce pictorial distortion and, as later explained in detail with regard to FIG. 4, includes means for redirecting the viewing axis downwardly to partially offset the upward inclination of axis 52. Hence, it should be understood that taken together, lamp 37, lens 46 and mirror 50 provide means for projecting an image of the film 30 to the screen 14.

It should be noted that screen 14 provides substantially the full front face of the viewer housing 12 and that lens assembly 46 is adapted to project to the screen, an image which extends over substantially its full area. Hence, lens assembly 46 provides a given projection angle and track length between the film 30 and the screen assembly 14. Without the tilted screen arrangement, this generally would result in either the use of a multiple folded path or a cassette position outside the screen extremities i.e. outside the area bounded by imaginary planes extended in parallel relation from the top and bottom of the screen. The latter would, in turn, result in a screen of small dimension as compared to the profile of the apparatus as viewed from a point forwardly of the screen. Hence, the unique structure provides a highly compact viewer employing a single mirror, a horizontal film plane and projection to a rear projection screen which substantially determines the overall size of the front face of the viewer housing.

In this structure, the mirror is positioned at an angle of 34 degrees with respect to the horizontal and hence redirects the vertical projection axis 48 along the axis 52 which is inclined by approximately 22 degrees above the horizontal. As previously indicated, however, the screen 14 redirects this optical axis downwardly so as to project an image over a limited viewing zone which includes the longitudinal axis 45, forwardly of the viewer. Consequently, although the screen is tilted such that its normal is directed upwardly from the longitudinal axis 45 of the viewer 10, the latter is intended for operation on a table of standard (i.e. 30 inch) height with at least some of the viewing audience seated and the viewing zone is canted downwardly from the screen normal such that its lower limits intercepts the longitudinal axis 45 of the viewer. Hence, the viewing zone will provide a vertical dispersion suitable for both a seated audience whose eye level is disposed close to the longitudinal axis, i.e. 40–45 inches above the floor, as well as a standing audience. This is accomplished in the preferred embodiment by a screen-like lenticular structure which uniformly emits or projects an image over a particular viewing zone (whose vertical extent from only one lenticule is shown) and additionally directs this viewing zone downwardly by an angle of 4½ degrees from the optical axis normal to the screen.

Figure 4:
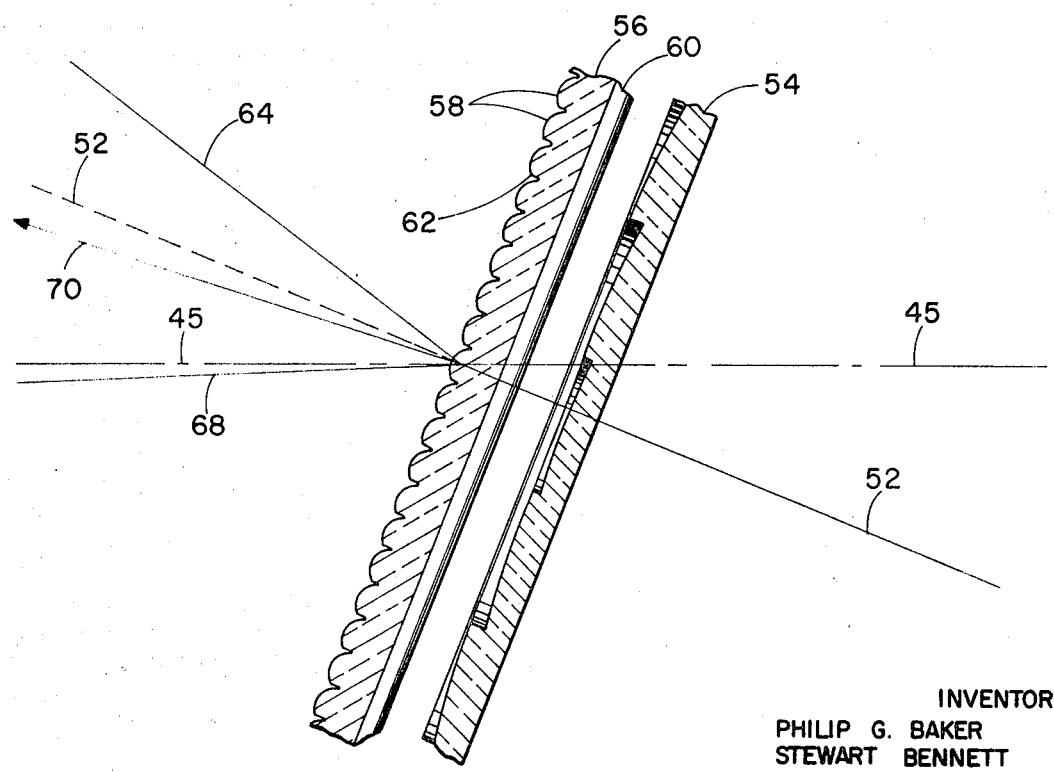
FIG. 4 is an enlarged view of a portion of the viewing screen as illustrated in FIG. 2.

This is more clearly explained in regard to FIG. 4 wherein the screen 14 is most clearly shown as comprising a lens assembly which includes a rear lens element 54 closely spaced (i.e. 3/16 inch) from a forwardly positioned element 56. The rearward lens 54 is a circular Fresnel lens which is adapted to collimate the projected rays (redirected by mirror 50) and direct them in a substantially parallel arrangement through the forward screen element 56. The latter is a crossed-lenticular lens or screen element which includes a plurality of parallel rib-like lenticules 58 and 60 disposed in crossed relation on the front and rear screen surfaces respectively. Hence, the lenticules of one face are orthogonal to the lenticules of the other face such that each set of lenticules provides controlled uniform dispersion of the transmitted radiation in respective orthogonal planes.

Preferably, the lenticules of both surfaces are elliptically shaped ribs which provide a substantially uniform dispersion over a precise angle, however, other shapes including substantially circular or parabolic curvatures may also be useful in certain applications of the invention. In the specific embodiment, the lenticules are chosen so as to provide a solid viewing angle in the vertical and horizontal planes which measures 39 degrees and 48 degrees respectively. A suitable screen arrangement is described in the copending application (Case No. 4351) of William T. Plummer filed herewith and assigned to the assignee of the present invention.

The axis of revolution, in this case the longitudinal axis, of forward lenticules 58 lie in the horizontal plane and hence control the dispersion in the vertical plane, that is, lenticules 58 form a viewing angle which as illustrated for the central lenticule is bounded by lines 64 and 68 and has a central bisecting axis 70. In this embodiment, the lenticules 58 are made asymmetrical so as to rotate the solid viewing angle downwardly with respect to the axis normal to the screen 14. Stated otherwise, the horizontally disposed lenticules 58 are distorted or asymmetrically formed so as to rotate the viewing zone downwardly so as to partially offset or compensate for the inclined screen position and thereby provide a viewing zone which includes the longitudinal axis 45 of the viewer. For example, as shown in FIG. 4, the lenticules 58 include substantially flat, lower edges 62 which eliminates upper portions, or that is, lowers the upper boundary 64 of the viewing angle as explained in the indicated copending application (Case 4351). Hence, this results in a substantially downward rotation of the viewing axis 70. In this specific embodiment, the viewing angle of each lenticule as measured in the vertical extends 15 degrees above and 24 degrees below the normal to the screen, and hence, the bisecting axis 70 is rotated 4½ degrees downwardly from the normal to the screen. Consequently, since the screen is tilted rearwardly 22 degrees from the vertical, and the dispersion angle extends downwardly 24 degrees from the screen normal, its lower boundary is directed slightly below the horizontal plane (i.e., 2 degrees) and the viewing zone will easily include a viewing audience located along longitudinal axis 45.

In an exemplary embodiment, an apparatus housing measuring approximately 10 inches in height, 10 inches in width and 15 inches in length was employed. The front viewing face was made up of a screen 7.2 inches high and 9.2 inches wide having its upper edge mounted approximately one-half inch below the top of the unit. Hence, the screen height is approximately 70 percent of the front face of the unit and most significantly the top of the unit, which receives the cassette, extends approximately from the top edge of the screen. A well, disposed in the rear of the top surface was designed to accept a cassette of the described type which measured 5 inches in length, 2 ¾ inches in height and five-eighths inches in width. A projection lens having a speed of $f/.92$ and .35 inches focal length mounted beneath the cassette-well produced a total projection distance or track length of approximately 17 inches from film to screen, and the projection path was folded by a single mirror placed at the base of the cabinet, approximately 5 inches below the film.

Those familiar with the motion picture arts will readily appreciate the novel and highly unique advantages of this invention which provides a simplified, compact viewer having a single fold projection track and full face screen. The compact arrangement permits easy cassette loading in the top of the viewer and cassette operation in a proper attitude for film processing. Further, the unique screen arrangement appropriately directs the screen image over a controlled viewing zone which is related to the orientation of the screen and the audience.

It should be understood that this invention may be practiced or embodied in still other ways without departing from the spirit or essential character thereof. Hence, the preferred embodiment herein is illustrative and not restrictive, the scope of the invention being indicated by the appended claims and all variations which come within the meaning of the claims are intended to be embraced therein.

What is claimed is:

1. A compact, portable photographic apparatus intended for mounting on a stand for use with a photographic film cassette for projection of images recorded on a film strip carried in such cassette for viewing of such images by both a seated and a standing audience, such cassette including a casing formed by a pair of substantially parallel side walls joined together at their edges by one or more edge walls, an opening located in a given edge wall for facilitating film projection operations, and means located in one of said side walls for progressively advancing such film strip across such opening responsive to actuation by external drive means, said apparatus comprising:

a housing having a base defining a support surface, a front viewing face, and a top surface of generally planar configuration extending rearwardly from the top edge of said front face, in generally parallel relation to said support surface;

means for receiving such cassette in an operative location rearwardly of said face, said receiving means including a slot-like opening in said top surface and a cassette-receiving well in communication with said slot-like opening, said well being configured for receiving such cassette with its such opening in a lowermost location;

drive means disposed alongside said well and configured for cooperation with such advancing means of such cassette for advancing such film strip across such cassette opening when such cassette is received in its operative location in said well; and image projecting means mounted within said apparatus housing for projecting images of such film strip toward said front face, said image projecting means including lens means, disposed below said well in operative relation to such cassette opening when such cassette is received in its said operative location, for projecting images of such film downwardly along a first axis substantially normal to said support surface, and a single reflective element located in adjoining relation to said base and configured for redirecting such images along an upwardly inclined axis toward said front face, said front face including a viewing screen inclined rearwardly over said base and substantially normal to said upwardly inclined axis so as to minimize pictorial distortion, the top edge of said screen being in close relationship to said top surface, said screen serving to define substantially the entire front face of said housing, said screen including means for directing such projected images forwardly over a restricted viewing zone whose bisecting axis is rotated downwardly with respect to said upwardly inclined axis in at least partial compensation for the upward inclination thereof such that said viewing zone includes an audience located forwardly of said apparatus in a plane passing through the center of said screen and in substantially parallel relation to said base thereby permitting viewing by both a seated and standing audience.

2. The apparatus of claim 1 wherein said reflective element extends within said base and at least partially below the bottom edge of said screen.

3. The apparatus of claim 2 wherein said base is recessed from said front face of said housing.

4. The apparatus of claim 2 wherein said viewing screen includes a plurality of horizontally arranged, elongated lenticules which are asymmetrical in the vertical direction so as to direct said viewing zone downwardly.

5. The apparatus of claim 4 wherein said screen is inclined at an angle of approximately 22° to said support surface, said lenticules provide a viewing angle of approximately 39° in the vertical plane whose bisecting axis is directed downwardly approximately 4½° from the axis normal to said screen.

* * * * *